United States Patent
Mayerle et al.

(10) Patent No.: US 11,547,054 B2
(45) Date of Patent: Jan. 10, 2023

(54) WEED SEED DESTRUCTION

(71) Applicant: Dean Mayerle, Saskatoon (CA)

(72) Inventors: Dean Mayerle, Saskatoon (CA);
Braydon Greenwald, Martensville (CA)

(73) Assignee: Tritana Intellectual Property Ltd., Saskatoon (CA)

( * ) Notice: Subject to any disclaimer, the term of this patent is extended or adjusted under 35 U.S.C. 154(b) by 757 days.

(21) Appl. No.: 16/574,384

(22) Filed: Sep. 18, 2019

(65) Prior Publication Data
US 2020/0107502 A1    Apr. 9, 2020

Related U.S. Application Data

(60) Provisional application No. 62/818,411, filed on Mar. 14, 2019, provisional application No. 62/741,241, filed on Oct. 4, 2018.

(51) Int. Cl.
*A01D 41/12* (2006.01)
*A01F 12/40* (2006.01)

(52) U.S. Cl.
CPC .......... *A01F 12/40* (2013.01); *A01D 41/1243* (2013.01)

(58) Field of Classification Search
CPC ... A01F 12/40; A01D 41/1243; B02C 13/205; B02C 13/282; A01M 21/02
See application file for complete search history.

(56) References Cited

U.S. PATENT DOCUMENTS

| | | | | |
|---|---|---|---|---|
| 3,894,695 A * | 7/1975 | Benedikter | ........... | B02C 13/288 241/188.1 |
| 5,425,507 A * | 6/1995 | Stumpff | ........... | B02C 13/02 241/DIG. 38 |
| 5,556,042 A * | 9/1996 | Roberg | ........... | A01F 12/40 241/101.76 |
| 8,152,610 B2 * | 4/2012 | Harrington | ........... | B02C 13/288 460/111 |
| 8,789,785 B2 * | 7/2014 | Lelas | ........... | B02C 13/20 241/188.1 |
| 9,723,790 B2 * | 8/2017 | Berry | ........... | A01F 12/00 |
| 2020/0296896 A1 * | 9/2020 | Mayerle | ........... | A01F 12/40 |
| 2021/0022289 A1 * | 1/2021 | Berry | ........... | B02C 13/16 |
| 2021/0282329 A1 * | 9/2021 | Hall | ........... | A01M 21/02 |

FOREIGN PATENT DOCUMENTS

| | | | | |
|---|---|---|---|---|
| DE | 102011088512 B3 * | 1/2013 | ........... | A01F 12/40 |
| GB | 1062209 A * | 10/1965 | ........... | B02C 2/10 |
| WO | WO-2018053600 A1 * | 3/2018 | ........... | A01D 41/12 |
| WO | WO-2020160622 A1 * | 8/2020 | ........... | A01D 46/26 |

* cited by examiner

*Primary Examiner* — Alicia Torres
(74) *Attorney, Agent, or Firm* — Adrian D. Battison; Ade & Company Inc.; Ryan W. Dupuis

(57) ABSTRACT

Weed seeds are destroyed in the chaff from a combine harvester by repeated high speed impacts caused by a rotor mounted in one of a pair of side by side housings which accelerate the discarded seeds into contact with stator bars at angularly spaced positions around the axis of the rotor. The stator bars are formed from bent sheet metal which are L-shaped or U-shaped in cross-section to define a first leg lying in a cylindrical surface surrounding the axis of the rotor and a second leg extending outwardly from the cylindrical surface connected to the first leg at an apex at a leading end of the first leg relative to the direction of rotation of the rotor. When U-shaped, the bars are symmetrical and can be reversed when the second leg is worn for extended life.

22 Claims, 12 Drawing Sheets

WEED SEED DESTRUCTION

This application claims the benefit under 35 USC 119( ) of Provisional applications 62/741,241 filed Oct. 4, 2018 and 62/818,411 filed Mar. 14, 2019, the disclosures of which are incorporated herein by reference.

This invention relates to a weed seed destructor which can be attached to a combine harvester so that weed seeds in the discharged chaff can be devitalized before being spread onto the ground.

BACKGROUND OF THE INVENTION

In U.S. Pat. No. 10,004,176 published Jun. 26, 2018 and US Publication 2018/0070534 published Mar. 15, 2018 discloses an arrangement in which weed seeds are destroyed in the chaff from a combine harvester by a rotary mill causing repeated high speed impacts by a rotor mounted in one of a pair of side by side housings which accelerate the discarded seeds in a direction centrifugally away from the rotor onto a stator including angularly adjustable stator surfaces around the axis. Thus the discarded seeds rebound back and forth between the rotor and the stator to provide a plurality of impacts. The angle of the discharge around the rotor axis can be changed to direct the seeds to the side of the combine away from a straw chopper, towards the guide fins of the tailboard of the chopper, or into the housing of the straw chopper.

SUMMARY OF THE INVENTION

It is one object of the invention to provide an improved construction of a rotary mill which provides an increased weed seed devitalization at reduced power requirement.

According to one aspect of the invention there is provided an apparatus for destroying weed seeds comprising:

a housing arranged to be mounted at a location on a combine harvester for receiving a feed material containing separated chaff and weed seeds separated by the combine harvester from harvested crop;

a rotor mounted in the housing for rotation in a direction of rotation about a rotor axis, the rotor including rotor surfaces thereon for engaging the feed material and for accelerating the feed material in a direction outwardly from the axis of the rotor;

at least one stator arranged at a location outwardly of the axis for engaging the weed seeds in the accelerated feed material;

said at least one stator comprising a plurality of stator bars at angularly spaced positions around the axis of the rotor;

each stator bar extending axially along the axis of the rotor and being spaced from a next adjacent stator bar to provide an axially extending space therebetween through which weed seeds can pass;

each stator bar comprising an elongate member which is shaped in cross-section to define a first leg lying in or generally tangential to a cylindrical surface surrounding the axis of the rotor and a second leg extending outwardly from the cylindrical surface connected to the first leg at an apex at a leading end of the first leg relative to the direction of rotation of the rotor.

The stator bar can thus be L-shaped with one leg of the L-shape forming the first leg and the other leg of the L-shape forming the second leg.

The stator bar can also be U-shaped with a base of the U-shape forming the first leg and one leg of the U-shape forming the second leg. The other leg of the U-shape has no direct functioning impact on the seeds during use. However this arrangement allows the stator bar to be reversed after the second leg is worn by impacts with the seeds so that the other leg of the U-shape and the base of the U-shape then can be used to extend the wear life of the stator bar.

Preferably the apex is smoothly curved at the junction between the first leg and the second leg so it defines a radius of curvature where the radius of curvature can lie in the range 5 to 15 mm.

This radius of curvature thus provides a quadrant which simulates the exterior of a circular cylindrical body and any seeds engaging this curved junction portion will behave in the same manner as seeds engaging the exterior of a cylindrical bar. However the addition, to this cylindrical surface, of the first leg extending from the quadrant in the tangential direction acts to engage seeds and direct them back into the rotor for additional impacts. Also the addition to this cylindrical surface of the leg extending outwardly from the quadrant provides an additional impact on seeds as they pass by the bar in the outward direction, which would otherwise pass a rear quadrant without impact. Extensive testing of this arrangement with the addition of the tangential and outward legs provides a significantly increased seed kill rate relative to the conventional cylindrical rod due to the increased numbers of impacts.

Preferably the second leg extends outwardly from the apex to define a portion thereof beyond an outer end of the apex. In this way the formation of the stator bar can be obtained very easily by bending a sheet metal strip along a center line forms two legs where the first lies in the cylindrical surface and the second extends outwardly typically at right angles to the first. However the legs may be of different lengths with particularly the second leg being very short or hardly existent.

Also the two legs and apex portion may be formed on the exterior of a hollow tube as the formation of the legs as part of a tube provides an increased strength which may be desirable in some embodiments. That is the legs have a length from the apex to their edge in the radial plane greater than the thickness of the material from which they are formed and are not merely the surfaces of a solid body Preferably the second leg lies at an angle to the first leg which is at right angles to the first leg. However the second leg can be bent through more than 90 degrees so that it is at an angle to the first leg which is less than right angles to the first leg. This forms the apex portion into a smooth part cylindrical body wrapped around from the first leg to the second leg. It will be appreciated that the impacts from the seeds on the stator bars occur over those parts facing inwardly into the rotor including the first leg and the apex portion. Impacts on the second leg do not interfere with the path of the seeds as they are already moving outwardly from the stator.

Alternately the second leg can be bent at an angle less than 90 degrees so that the angle between the first and second leg is greater than 90 degrees. In this case all impact surfaces will tend to reflect the seed back to the rotor creating a higher devitalization rate with higher power requirements.

Typically the stator bars lie in a line parallel to the axis so that the apexes are directly parallel to the rotor axis. However the stator bars can be inclined to the line parallel to the axis at the cylindrical surface so that they are all tilted to the left or right. Where the bars are parallel to the axis, typically the second legs lies in an axial plane of the axis of the rotor.

Preferably the width of the first leg in the cylindrical surface is in the range 10 to 20 mm. Preferably the spacing between each bar and the next at the cylindrical surface lies in the range 10 to 50 mm. The width of the first legs relative to the spacing between the trailing edge of each bar and the apex of the next controls the amount of material which is allowed to escape between the bars. Increasing the length of the legs and/or decreasing the spaces increases the amount of material which remains inside the stator and thus increases the number of impacts and the power requirement for moving the material. Conversely the power can be reduced by increasing the proportion of space to leg but with consequent reduction in impacts and hence reduction in seed destruction. These ratios can be selected depending on the amount and type of seeds to be treated. Typically the width of the second leg in the outward direction is in the range 10 to 20 mm.

Preferably the outer edge of each of the second legs lies in a common imaginary cylinder surrounding said cylindrical surface as this makes the manufacture of symmetrical stator bars by bending sheet metal strips a more effective method.

Preferably the stator bars extend along a full height of rotor so that the height of the stator matches that of the rotor. However stators can be stacked one on top of another where the rotor is of increased height.

Preferably the first and second legs of the stator bar comprise portions which are flat as this allows a simple bending of a flat strip to form the bars.

Preferably each of the stator bars comprises a sheet metal plate which is bent to form the legs. However other materials and methods of manufacture can be used.

Preferably the stator construction includes a stator support member and a plurality of angularly spaced stator portions mounted on the support member where the stator support member is cylindrical so as to surround the axis of the rotor and the stator portions are part cylindrical with each of the plurality of stator portions extending around a part only of the periphery of the support member. Each such portion includes a plurality of the stator bars.

In this arrangement preferably there is provided a discharge opening between each stator portion and the next.

This construction of separate replaceable stator portions allows a plurality of the stator portions to be provided having different characteristics which can be selected for different weed seed sizes and amounts. The selection of the portion also can be used to change power requirements.

In particular, the different characteristics or the portions to the used in any circumstance relate to the length of the first leg of the stator bars around the axis and/or the spacing between the stator bars around the axis.

This construction of part cylindrical stator portions allows the portions to be hard surface coated as a separate component from the support member. To provide an effective mounting of the separate portions, preferably each of the stator portions comprises mounting edges at angularly spaced ends of the portion for attachment to a rail of the support member. This can be used with a support structure which comprises a top and bottom ring around the axis of the rotor with a plurality of rails parallel to the rotor axis.

In some cases the stator includes a plurality of discharge openings at angularly spaced positions around the stator with the support member being angularly adjustable around the rotor axis to move the openings.

In most cases there is provided inner and outer coaxial cylindrical stators where preferably at least one of inner and outer stators is adjustable to change the angular relationship therebetween. Preferably the angular position of at least one of the stators is adjustable by a control linkage from a cab of the combine harvester.

Preferably there are provided rotor components between the inner and outer stators.

Preferably the rotor comprises a hub carrying rotor blades defining said rotor surfaces where the blades are pivotally mounted about an axis parallel to the rotor axis so as to act as flails.

Preferably the rotor comprises a plurality of posts where an outer surface of each post has a leading edge which is closest to the cylindrical surface and tapers away from the cylindrical surface toward a trailing edge.

The arrangement herein thus in one example provides three stator rings where on the outer ring there are six stator inserts. Some or all of the inserts have an additional release opening, in addition to the spaces between the stator bars to allow material in the impact mill the ability to escape from inside the stator to the next stage, thus reducing horsepower. The openings can be located within the stator insert or can be located between each insert and the next.

The middle ring has five inserts so as to define a larger gap between the stator bars. The inner ring has four inserts so as to form a yet larger gap between the stator bars. All the stator bars in each of the inserts have the same profile, formed for example with a 7 mm leading radius and 20 mm legs at 90 degrees apart. The apex is preferable smoothly curved without a sharp intersection between the legs since a sharp point would risk material hanging up on the edge which would act to increase power requirements.

The user can set a predetermined balance between the seed kill rate and power requirements, both of which are dependent on the number of impacts and thus the ratio of the openings to bars in the stator.

Thus all rings can incorporate larger spaces or additional release openings as are provided on the outer ring. If there is a reason to increase the kill rate on a small weed seed, this ratio of opening area to impact area can be adjusted by selecting bars where the first or tangential legs are increased in length or by reducing the gaps between the stator bars and/or eliminating or reducing the additional release openings on the outer ring to increase the time the weed seed spends being impacted in the mill.

According to another definition of the invention there is provided an apparatus for destroying weed seeds comprising:

a housing arranged to be mounted at a location on a combine harvester for receiving a feed material containing separated chaff and weed seeds separated by the combine harvester from harvested crop;

a rotor mounted in the housing for rotation in a direction of rotation about a rotor axis, the rotor including rotor surfaces thereon for engaging the feed material and for accelerating the feed material in a direction outwardly from the axis of the rotor;

at least one stator arranged at a location outwardly of the axis for engaging the weed seeds in the accelerated feed material;

said at least one stator comprising a plurality of stator bars at angularly spaced positions around the axis of the rotor;

each stator bar comprising an elongate member extending axially along the axis of the rotor and being spaced from a next adjacent stator bar to provide an axially extending space therebetween through which weed seeds can pass;

wherein at least one stator bar comprises a first surface tangential to the rotor axis joined to a curved apex surface joined to a second surface extending generally outwardly from the rotor axis.

Preferably the second surface of the stator bar is substantially perpendicular to the tangential surface.

Preferably the first and second surfaces of the stator bar are substantially flat.

Preferably the first surface of the stator bar has a length in the tangential direction which is greater than 10 mm.

Preferably the first surface of the stator bar has a length in the tangential direction which is at least equal to a length of the second surface in the radial direction.

Preferably the first surface has a length of the stator bar in the tangential direction which is at least equal to the spacing between the bars in the tangential direction.

Preferably the spacing between the bars in the tangential direction is at least equal to the length of the second surface in the radial direction.

Preferably the spacing between two of the bars in the tangential direction is greater than the spacing between others of the bars.

In accordance with another important feature of the present invention which can be used independently or with any of the above features, the rotor comprises a plurality of blades where the blade is symmetrical with a leading edge and a trailing edge so that the blade can be reversed when worn on the leading edge.

Preferably the rotor comprises a plurality of posts where the post is symmetrical with a leading edge and a trailing edge so that the rotor can be reversed when worn on the leading edge of the post. Optionally the rotor posts can be hardened or hard surfaced on the leading edge and trailing impact surfaces in a symmetrical pattern.

In this arrangement also the stator bar can be symmetrical with a leading edge and a trailing edge so that the stator bar also can be reversed when worn on the leading edge. Optionally the stator bars can be hardened or hard surfaced on the leading edge and trailing impact surfaces in a symmetrical pattern.

In order to take best advantage of this reversibility, preferably there are provided first and second rotors each associated with a respective one of first and second stators and the first and second rotors are driven in opposed directions so that the blades, posts and stators of one can be replaced by the blades, posts and stators of the other when worn on the leading edges thereof.

In one construction the rotors are arranged side by side driven about parallel preferably upstanding axes and driven in opposed directions.

In another construction, the rotors are arranged at opposite ends of a common shaft and mounted in opposed symmetry so that in effect the common rotation of the shaft acts that the opposed rotors are driven by the shaft in opposed directions. In an arrangement of this type, the shaft is mounted across the chaf discharge location and carries an auger flight moving the material outwardly to the sides of the combine where a pair of seed destructors are located with the rotors mounted on the shaft. That is, with the seed destroyers at the ends of the common shaft in effect the rotors are driven in the same direction due to the common shaft but, in respect of the stators, the direction of rotation is opposed so that the wear occurs on opposed surfaces so that the rotors worn one side can be flipped from one side to the other side.

According to another feature, the stator bars can taper from one end to an opposed end. In this arrangement each trailing stator bar is arranged in an opposing angle to the previous in a circular array so that the impact angle to vertical alternates and the space between the bars remains consistent. In this manner chaff and weed seeds are more evenly spread in the housing creating a more even and reduced wear while increasing devitalization rates with less power required. In this arrangement, the stator bars have can a v-shaped slot along a center line at the wider end to allow additional passage of residue to reduce power requirements.

According to another aspect of the invention there is provided an apparatus for destroying weed seeds comprising:

a first weed seed destructor comprising
a first housing arranged to be mounted at a location on a combine harvester for receiving a feed material containing separated chaff and weed seeds separated by the combine harvester from harvested crop;
a first rotor mounted in the housing for rotation in a direction of rotation about a rotor axis, the first rotor including rotor surfaces thereon for engaging the feed material and for accelerating the feed material in a direction outwardly from the axis of the first rotor;
at least one first stator arranged at a location outwardly of the axis for engaging the weed seeds in the accelerated feed material;
said at least one first stator comprising a plurality of first stator bars at angularly spaced positions around the axis of the first rotor;
wherein the first rotor comprises a plurality of first rotor posts where the first post is symmetrical with a leading edge and a trailing edge so that the first rotor can be reversed when worn on the leading edge;
wherein said at least one first stator bar is symmetrical with a leading edge and a trailing edge so that the first stator bar can be reversed when worn on the leading edge;
a second weed seed destructor comprising
a second housing arranged to be mounted at a location on a combine harvester for receiving a feed material containing separated chaff and weed seeds separated by the combine harvester from harvested crop;
a second rotor mounted in the housing for rotation in a direction of rotation about a rotor axis, the second rotor including rotor surfaces thereon for engaging the feed material and for accelerating the feed material in a direction outwardly from the axis of the second rotor;
at least one second stator arranged at a location outwardly of the axis for engaging the weed seeds in the accelerated feed material;
said at least one second stator comprising a plurality of second stator bars at angularly spaced positions around the axis of the second rotor;
wherein the second rotor comprises a plurality of second rotor posts where the second post is symmetrical with a leading edge and a trailing edge so that the second rotor can be reversed when worn on the leading edge;
wherein said at least one second stator bar is symmetrical with a leading edge and a trailing edge so that the second stator bar can be reversed when worn on the leading edge.

and wherein the first and second rotors are driven in opposed directions so that the blades, posts and stators of one can be replaced by the blades, posts and stators of the other when worn on the leading edges thereof.

Optionally the rotor posts can be hardened or hard surfaced on the leading edge and trailing impact surfaces in a symmetrical pattern.

Optionally the stator bars can be hardened or hard surfaced on the leading edge and trailing impact surfaces in a symmetrical pattern.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
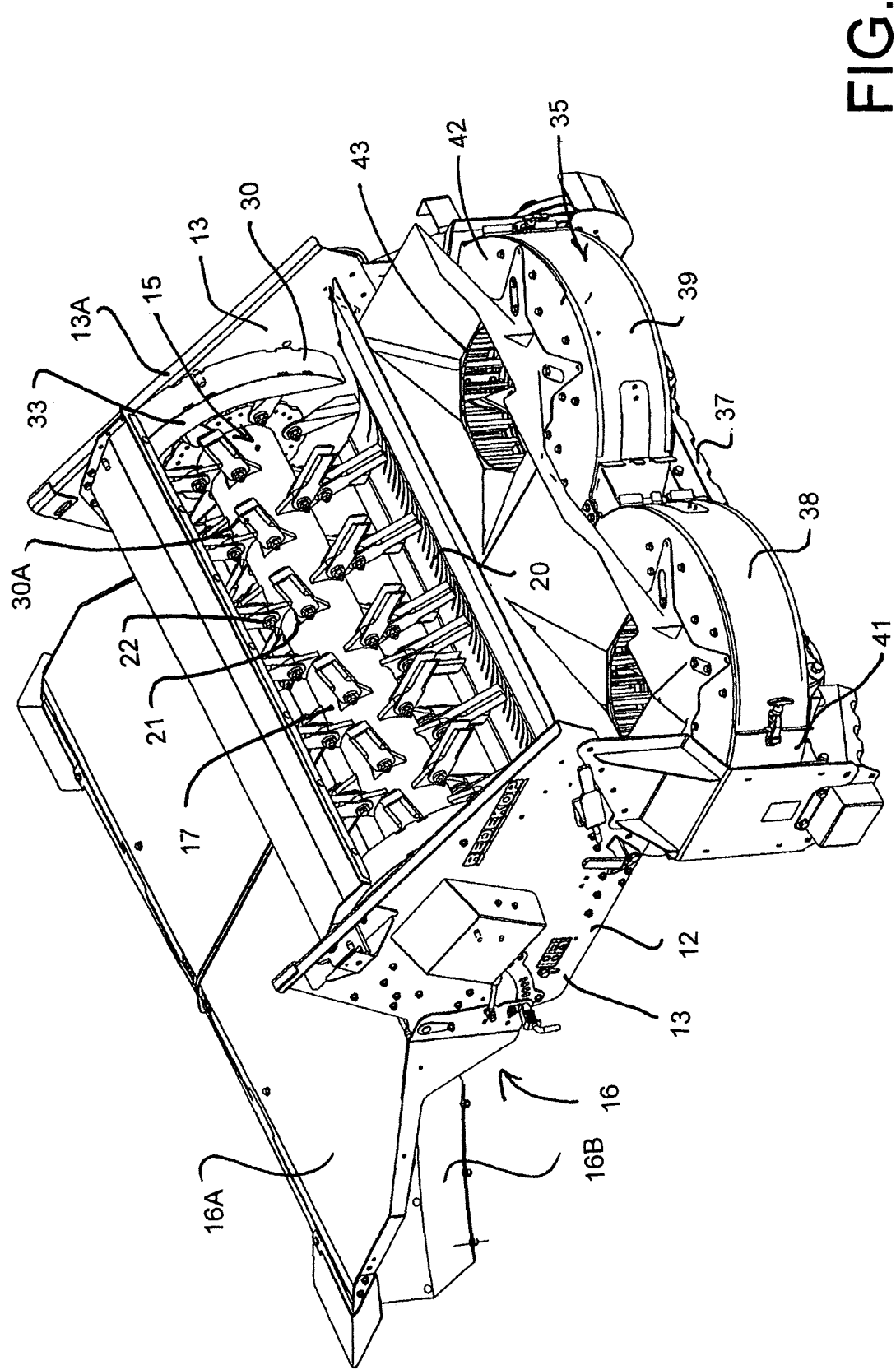
FIG. 1 is an isometric view of an apparatus for destruction of weed seeds according to the present invention which is arranged in a first embodiment where the rotary mill section is mounted at a position on a combine harvester at the rear of the sieve so as to discharge the chaff and destroyed seeds towards the straw chopper's tailboard to enhance residue spreading to both sides of the combine harvester.

The apparatus herein is shown in FIG. 1 mounted on a combine harvester carried on ground wheels and including harvesting components of a conventional nature the rearmost one of which is the sieve which discharges chaff and discarded seeds including weed seeds to the rear edge of the sieve.

Figure 6:
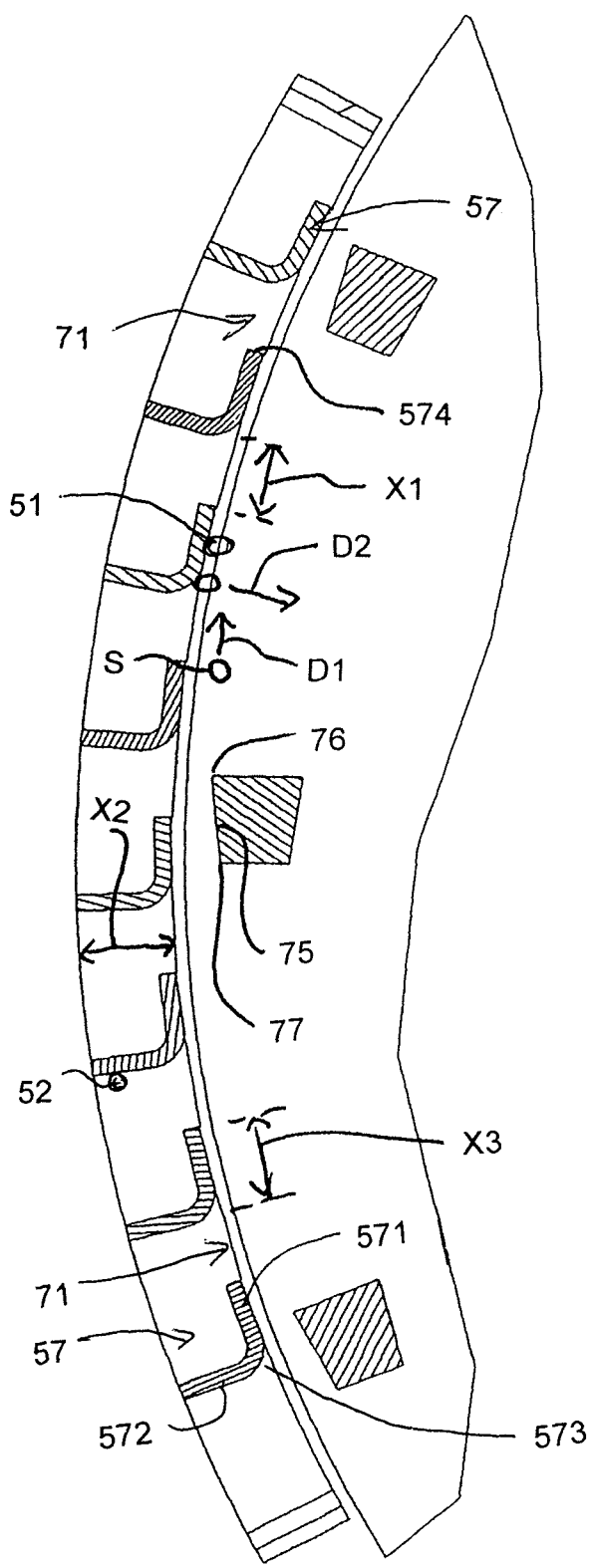
FIG. 6 is a plan view of the cross section of one stator element of the inner ring of the rotor of the embodiment of FIG. 4.

The combine harvester includes a chopper and discharge arrangement 9 shown in FIGS. 1 and 6 is basically as shown in U.S. Pat. No. 6,840,854 issued Jan. 11, 2005 of Redekop, the disclosure of which is incorporated herein by reference. The chopper thus comprises a housing 10 defined by a top wall 11, a bottom wall 12 and two end walls 13. The end walls 13 include attachment means 13A for attachment of the housing to the outlet of a combine harvester for discharge of straw and optionally chaff from the combine harvester into an inlet opening 15 of the housing 10. The bottom wall 12 defines a semi-cylindrical portion extending from the inlet 15 to an outlet 16 through which chopped straw and air is discharged at relatively high velocity for spreading across the field in a wide spread pattern.

Within the housing is mounted a hub 17 which is carried on suitable bearings 31 for rotation about a hub axis 18 at a center of the housing so that blade members 19 carried by the hub sweep around within the housing to entrap straw fed through the inlet 15 and to carry the straw and air past stationary blades for chopping and for discharge through the outlet 16. The stationary blades are mounted on the housing at a position approximately midway between the inlet 15 and the outlet 16 so that the blade members 19 sweep between the stationary blades in a cutting action.

In this arrangement of the chopper, there is provided three axially spaced sections of the chopper assembly including a first fan section 30 at one end of the hub 17 and the second fan section at the other end of the hub 17. In-between the two narrow fan sections 30 is defined a center section 30A which provides the whole of the cutting action.

The chopper and spreading assembly 9 is arranged to be mounted at a rear straw discharge of the combine harvester and includes the housing 10, the rotor 17 mounted in the housing 10 for rotation around a generally horizontal axis and carrying the plurality of chopper blades 19 for chopping the discharge material.

At the exit 16 is provided the material spreading assembly which can be the form of a tailboard 16A with guide fins 16B for receiving the chopped material and spreading the material to the rear and sides of the combine harvester.

In the Figures the seed destructor which includes two separate destructor elements 38, 39 side by side each including a housing 36 with base 37 and a spiral outer surface 40 upstanding from the base and extending to an outlet or discharge mouth 41. The base and outer surface are covered by a top planar cover panel 42 which has an opening 43 Inside a center part of the spiral which defines a central inlet for feeding the material from the sieve containing the chaff and weed seeds onto a rotor 44 mounted on a hub 45. Around the hub 45 is provided a plurality of pivot pins or bolts 46 each carrying a pair of flail blades 47. The flail blades extend from an inner end with a plurality of fingers extending into connection to the pin 46. An outer end of the flail blade 45 broadens in the axial direction of the axis of the hub and terminates in an edge 48 lying in an imaginary cylindrical surface surrounding the axis. The flails can retract inwardly by pivotal movement in the event of impact with a larger object. Thus the blades are pivotally mounted about an axis parallel to the rotor axis so as to act as flails. Also each of the rotor blades includes a sharpened cutting edge 49 radial to the axis and a fan blade portion 50 generally axial of the axis so that the blades are of a similar construction to those used in the chopper and described above.

Around the rotor is provided a stator formed by two stationary annular coaxial cylinders 51 and 52 with cylinder 51 inside the cylinder 52. The stator cylinders are carried on the top cover so that they hang down from an upper annular flange fixed to the cover. The cover forces the weed seeds to contact the stator and rotor thus devitalizing the seed.

The base 37 is carried on a beam 371 which mounts the two destructor elements side by side and provides drive through an input shaft 372 and two gear boxes to the upstanding shafts 373 driving the rotor hubs 45.

Figure 2:
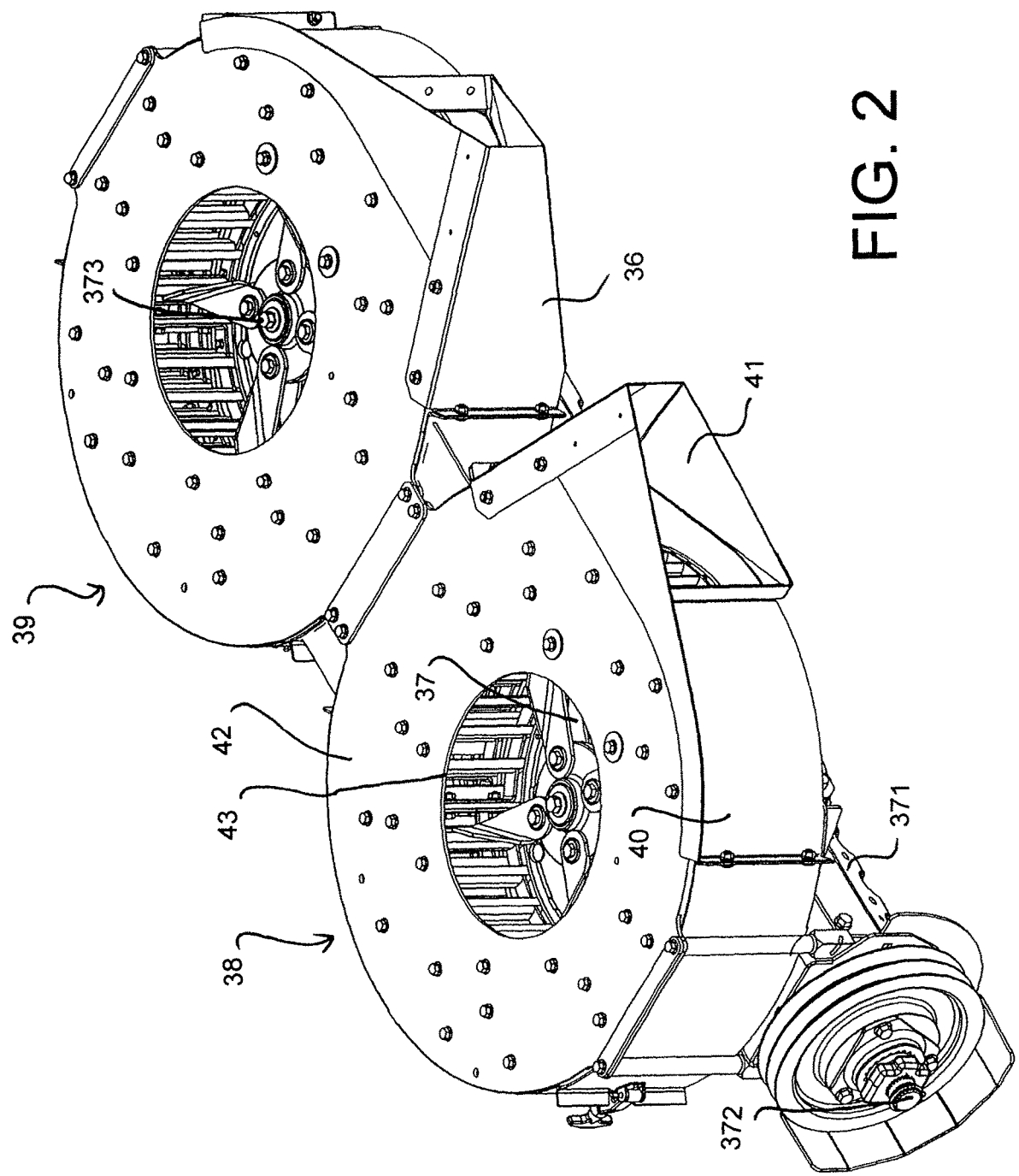
FIG. 2 is an isometric view of the apparatus for destruction of weed seeds of FIG. 1 which shows the structure of the rotary mill.
Figure 3:
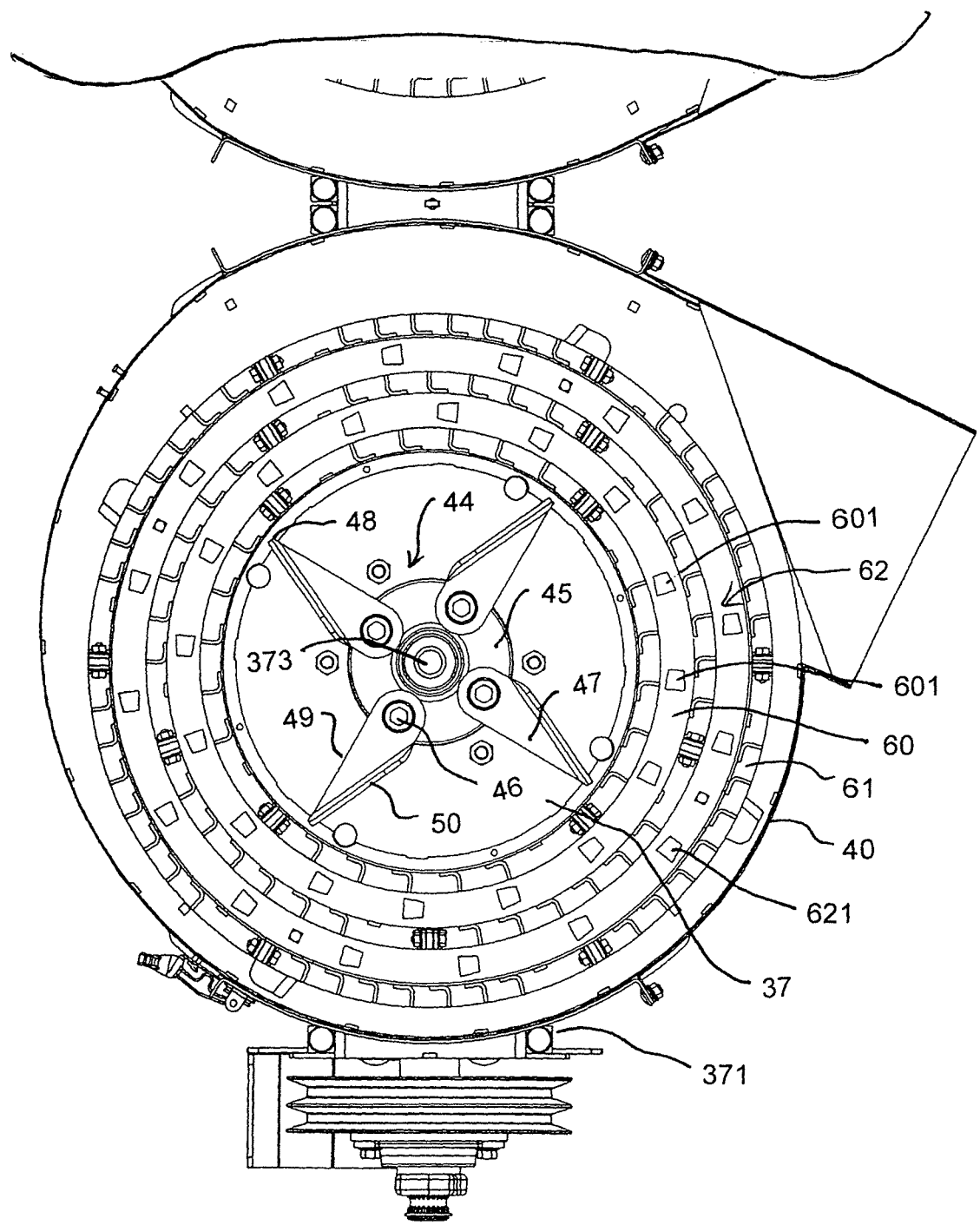
FIG. 3 is a cross sectional plan view of one rotary mill of FIG. 2.
Figure 4:
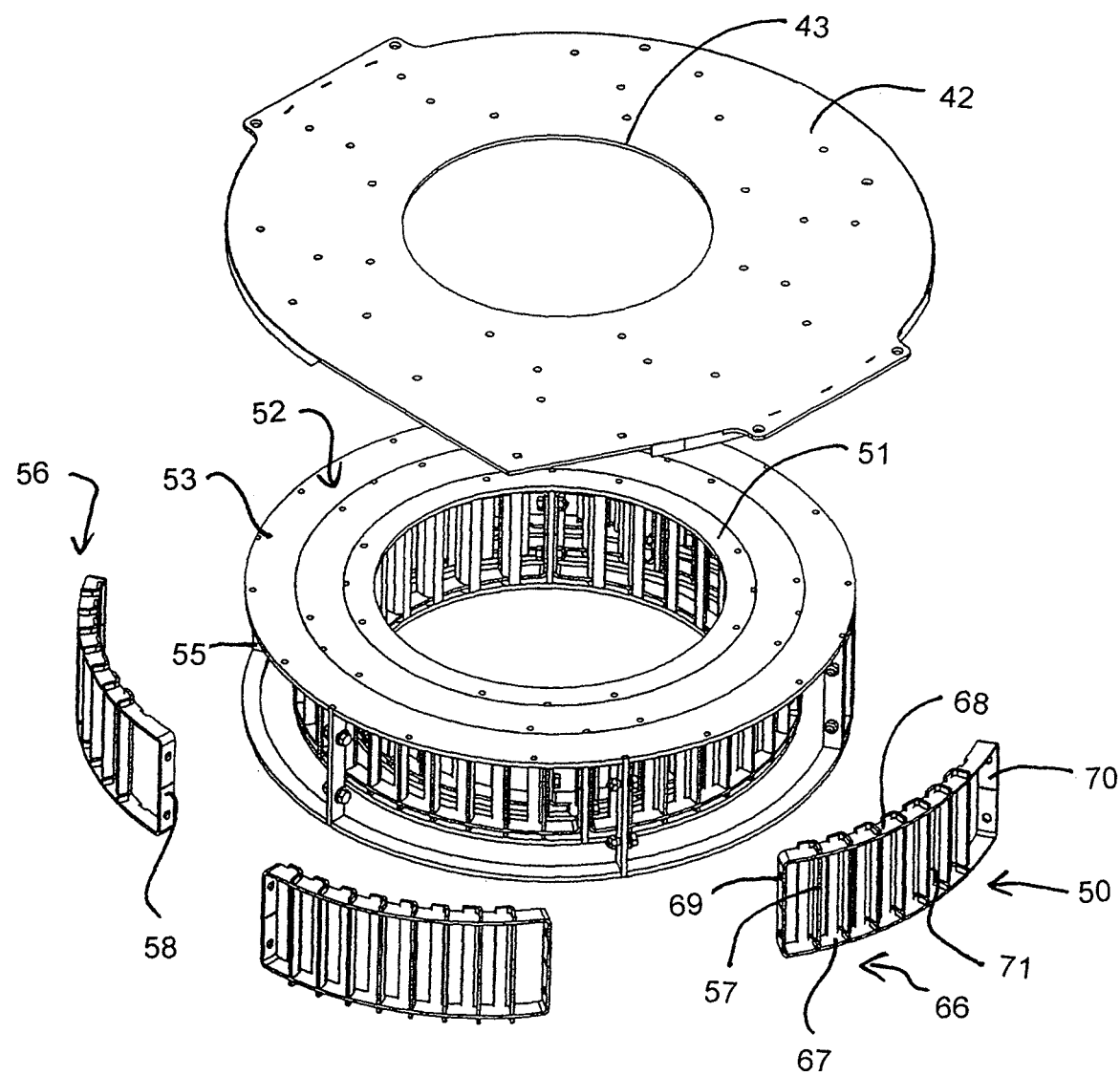
FIG. 4 is an isometric view of the stator frame of FIG. 2 with some of the replaceable stator components removed.
Figure 5:
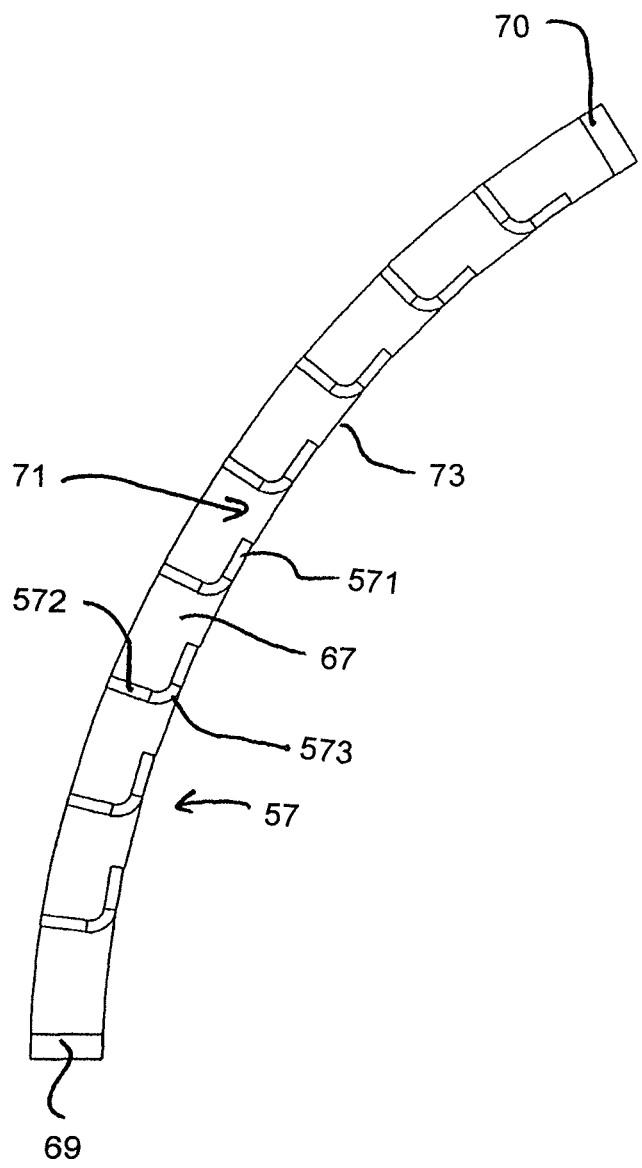
FIG. 5 is a plan view of one stator element of the outer ring of the rotor of the embodiment of FIG. 4.

Each stator cylinder is of the construction shown in FIG. 4 and includes a top flange 53, a bottom ring 54 parallel to the flange and a plurality of upstanding connecting posts 55 to form a rigid structure as shown in FIG. 2 or 3.

The stator cylinder has a plurality of inserts 56 closing the space between the flange 53 and the bottom ring 54. Each insert forms a part cylindrical surface which extends around the axis by a limited angle. As shown in FIG. 3 there are six such inserts each covering an angle of the order of 60 degrees so that the inserts cooperate to partly surround the axis. The inserts may manufactured with a full amount of stator bars or be made with a larger openings between the stator bars. The combination of inserts can be selected to increase or decrease the number of openings or additional release points.

Each insert 56 has a plurality of stator bars 57 parallel to the rotor axis. Different constructions of inserts can be provided with different numbers and dimensions of bars to provide a different grinding or impacting effect on the material in engagement with the inserts. The inserts are shaped with an angled edge flange 58 which is shaped to engage against a side edge of a suitably shaped one of the rails 55. Thus as shown in FIG. 3, the ends 58 of the plates 56 engage against sides of the rails 55. In FIG. 4, three types of inserts are shown, of which many more styles could be envisioned, which can be selected for use in the base frame of FIG. 3.

In operation, the rotor flails 47 acts to suck chaff and weed seed into the mills and accelerate and direct the material across the inside surface of the inner annular insert 51 to impact, shear and force some of the material through the spaces between the bars 57. The outer edge 48 of the flail blade thus acts to wipe the material cross the inside surface of the selected insert with the edge 48 having a height substantially matching the height of the insert 56.

That material which does not escape through the spaces between the bars 57 is carried around the inner surface of the insert 56 to the next one of a plurality of discharge slots or spaces between the bars. The material sliding on the inner surface thus can escape through the inner stator 51 to the next outer annular stator 52. Between the two stators 51, 52 is a rotor 60 defined by ring of posts 601 which are attached to a base plate of the rotor so as to rotate with the center hub and flail blades. These posts 601 act to impact, accelerate and shear the material round the inside surface of the outer stator 52. The arrangement can also include a third stator 61 coaxially surrounding the stator 52 with a further rotor 62 with posts 621 of a similar structure to rotor 60 between the stators 52 and 61.

The stator 61 has the same structure as the stators 51 and 52 but of increased diameter. Again there is a plurality of separate inserts 56 at angularly spaced positions. The outer stator therefore operates in the same manner under the rotation impetus on the material from the posts of the rotor 62 to impact and shear the material and then to allow any remaining material remaining on the inner surface of the outer stator to escape outwardly. The material escaping is flung outwardly and angularly against the outer surface 40.

Each stator which is in the form of a ring or cylinder supported from the top cover and located between the components of the rotor is thus formed from the fixed base frame shown in FIG. 3 with a plurality of locations each for mounting a respective one of the stator insert components with an outlet opening between each plate or between each stator bar of the plate and the next. As shown in FIG. 4, different forms of the stator inserts can then be selected for use with the frame of FIG. 3 and installed and replaced as required.

The use of separate stator inserts provides replaceable stator components which have a number of advantages which include:

-a- simple service, it is possible to replace and discard small parts of the stator rather than the entire stator ring.

-b- customer cost, the arrangement provides lower cost service parts, longer lasting parts with the possibility that the smaller parts of the components alone can be made harder.

-c- manufacturing advantage, the components individually are lower cost, higher volume of a smaller part allowing economy of scale to provide lower cost manufacturing.

-d- material, the manufacture of a smaller part allows the use of a higher value material for that part while the frame itself can be manufactured from other materials. This allows less material to be used, allows for harder or heat treatable material to be used for the wear surfaces of the replaceable stator components while softer, more ductile or weldable material can be used in the frame. In particular the stator components or inserts form small parts which are suitable for hard surfacing or carbide coating processes to provide increased hardness and wear resistance.

-e- Stator selection; this allows for different stator profiles, that is different shapes and arrangements of holes, to be selectable to best match to typical weed seed targets in each farming region. That is different regions in the world have different weed problems, so that the system of the present invention allows use of a common support frame and different wear inserts to best target the efficacy of the desired weed seed in that region.

-f- Stator Style; the system can provide different styles of stator inserts to cover different manufacturers particular design of the stator.

The stator bars 57 of the replaceable stator inserts 56 may be hard surface coated with a suitable material such as carbide which reduces impact damage. One or all stators 50, 51 and 61 defined by the annular frame and the supported stator components can be adjusted by rotation around the axis of the rotor so as to move the position of the openings between the plates. This acts to change the distance that the material must traverse before it reaches the escape slot, or a position where the stator bars are spaced a greater distance apart.

The angular position of the stators 50 and 51 is adjustable around the axis X of the hub to move the openings angularly. If the openings of the inner stator are located at an angular position so that they are aligned with the openings of the outer stator then any material exiting the openings of the inner stator will typically escape from the second stator by direct radial movement through both openings simultaneously thus minimizing any processing by the outer stator. Movement of one or both of the stators so that the openings are not aligned will increase the effective processing by the second outer stator. It will be appreciated that this processing can be adjusted from a position of minimum processing where the opening are aligned to a position of maximum processing where each opening in the inner stator discharges onto the outer stator at a distance which is at the beginning of the adjacent stator component so that the material must traverse the whole surface of the component before reaching the next opening in the outer stator. The actuators are operated by a control where the control is in the cab for on-the-go control of the position of the stators.

It will be appreciated that the weed destructor herein uses a significant amount of power to drive when empty and an increased amount when filled with the crop materials. This power can be minimized by bypassing the device as described herein and by disconnecting the drive thereto when no treatment of the crop materials is required. The power can be reduced as above by moving the stators to the most effective position with minimum crop treatment.

Thus the system herein provides adjustability of stator positions on the go, the advantages of which include:

-a- Setting the stator contact surface to produce the best efficacy rate to match weed problems in field while reducing power requirements.

-b- Reducing power by reducing stator contact time of the crop material. This is a significant advantage includes which allows increased combine harvest capacity as current destructor systems are reducing a farmer's threshing capacity by up to 30% as well as reduced fuel consumption.

-c- Manual Adjustment on the go by In Cab control of an actuator allows the operator to change as they enter visible weed problem areas in the field. The actuator drives relative position of the stator rings to change the number of impact surfaces a seed encounters as it passes through the mill.

-d- Automatic Adjustment on the go allows an operator to develop a GPS map of a weed problem by aerial surveillance or when mid-season spraying. This information can be used to adjust the stator positions for maximum seed efficacy using maximum power in that area and reduce contact surface after the combine passes through the weed area.

In at least one stage, therefore, the weed seeds do not pass through the stator but are rebounded between the rotor and the stator. The rotor also propels the weed seed from the housing without needing to pass through an outside stator surface so that a higher exit velocity is obtained.

The arrangement herein thus provides at least one stator 50 comprising a plurality of stator inserts 66 including the stator bars 57 at angularly spaced positions around the axis of the rotor. The inserts 66 include bottom and top rails 67 and 68 and end support posts 69 and 70 forming a rectangular rigid structure with the bars 57 welded to the rings 67 and 68 so as to extend at right angles thereto leaving spaces 71 between each bar and the next and between the endmost bars and the posts 69 and 70. Each stator bar thus extends axially along the axis of the rotor and being spaced from a next adjacent stator bar to provide an axially extending space 71 therebetween through which weed seeds can pass.

Each stator bar 57 comprises an elongate member which includes three impact surfaces which can be varied in size and length to vary the number of impacts a weed seed encounters as it passes through each stage of the mill. The stator bar is preferably L-shaped in cross-section to define a first leg 571 lying in a cylindrical surface 73 surrounding the axis of the rotor and a second leg 572 extending outwardly from the cylindrical surface connected to the first leg at an apex 573 at a leading end of the first leg relative to the direction D of rotation of the rotor.

The arrangement herein thus provides a stator bar which includes a tangential surface, an apex at a leading edge of the tangential surface and a third surface which is generally radial whereas previous arrangements typically before have had either a tangential or radial or apex, but not all three and thus provides an advantage over, and differentiator from, the prior art, enabling higher weed seed devitalization rates at lower power requirements.

The stator bar is preferably formed by bending a strip of sheet metal along a center line or approximately at the center line to form the legs 571 and 572 with a smooth curve 573 interconnecting the legs. The apex 573 defines a radius of curvature which can lie in the range 5 to 15 mm and more preferably of the order of 7 mm. However the same surfaces can be formed on the outside of a body which is a solid bar, not a bent strip or on the outside of a hollow bar.

As shown in FIG. 6, a seed S is carried along in the direction D1 by the rotation of the rotor blade so that it moves around the axis with some outward movement under centrifugal force. Some seeds impact the leg 571 on its inner surface. Some seeds pass through the opening 71 between the trailing end 574 of the leg 571 and the apex 573 of the next stator bar. These seeds and accompanying material will escape outwardly from this stator to the next stator or to the wall 40. Some of that material may engage the radial outwardly extending surface of the leg 572 so as to change direction but generally any material impacting the bar outside of the apex will escape outwardly. Some of the seeds and material will impact the bar 57 at the apex 573.

Figure 8:
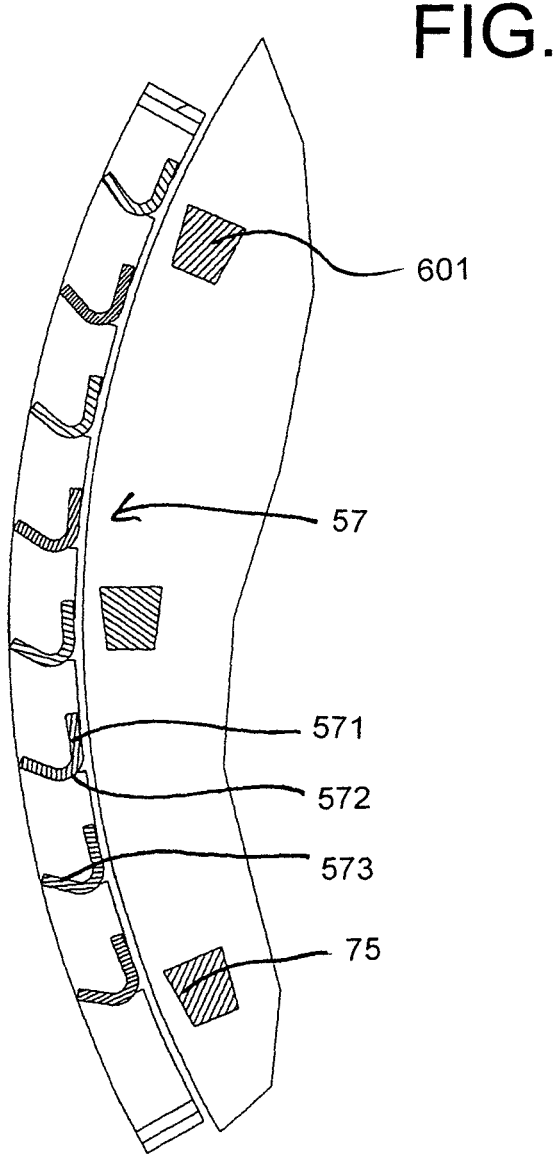
FIG. 8 is a plan view of the cross section of one stator element of the inner ring of the rotor of the embodiment of FIG. 4 showing a second alternative shape for the stator bars.

The second leg 572 typically lies in an axial plane of the axis of the rotor but in some cases such as that shown in FIG. 8 where the bend in the strip forming the bar is greater than 90 degrees, the leg 572 may be close to or even alongside the leg 571. The legs are typically flat as the only bend in the strip is at the apex.

Figure 7:
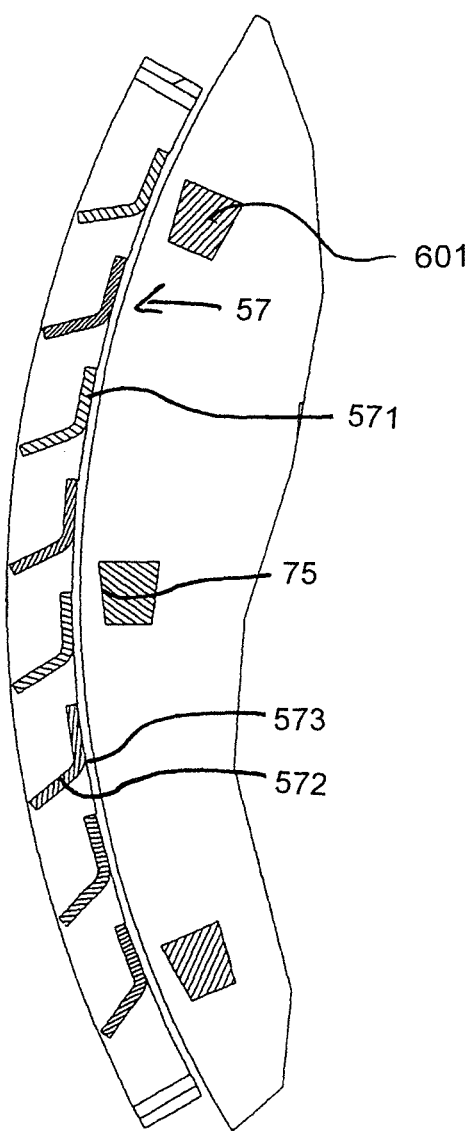
FIG. 7 is a plan view of the cross section of one stator element of the inner ring of the rotor of the embodiment of FIG. 4 showing a first alternative shape for the stator bars.

Alternately the second leg 572 could be bent less than 90 degrees as shown in FIG. 7 so that the angle between the two legs is greater than 90 degrees. In this case all three surfaces would tend to reflect the seed back to the rotor and therefore would create more impacts as the seeds pass through the mill but with a greater power requirement.

The width of the first leg in the cylindrical surface 73 as indicated at X3 is in the range 10 to 30 mm and preferably of the order of 20 mm.

The width of the second leg in the outward direction as indicated at X2 is in the range 10 to 30 mm and preferably of the order of 20 mm. This provides an arrangement in which all the second legs are of the same length with the outer edge thereof lying in an imaginary cylinder 74.

The width of the space 71 in the cylindrical surface 73 as indicated at X1 is in the range 10 to 30 mm and preferably of the order of 20 mm.

In order to prevent the outer edge or the posts 601, 621 of the rotor from pinching material against the legs in the cylinder 73, the rotor an outer surface 75 of each post 601 has a leading edge 76 which is closest to the cylindrical surface 73 and tapers away from the cylindrical surface toward a trailing edge 77.

The radius of curvature of the portion 573 thus provides a quadrant which simulates the exterior of a circular cylindrical body. Any seeds engaging this curved junction portion or quadrant will behave in the same manner as seeds engaging the exterior of a cylindrical bar.

However the addition, to this cylindrical surface 573, of the first leg 571 extending from the quadrant in the tangential direction acts to engage seeds as indicated at S1, which would in respect of a conventional cylindrical bar, pass between the bar and a next bar to escape from the rotor, and instead directs them back into the rotor for additional impacts.

Also the addition to this cylindrical surface 573 of the second leg 572 extending outwardly from the quadrant 573 provides an additional impact on seeds as indicated at S2 as they pass by the bar in the outward direction. Such seeds would otherwise in a conventional cylindrical bar pass a rear quadrant of the bar without impact.

Extensive testing of this arrangement with the addition of the tangential and outward legs 571, 572 provides a significantly increased seed kill rate relative to the conventional cylindrical rod due to the increased numbers of impacts due to these effects.

Figure 9:
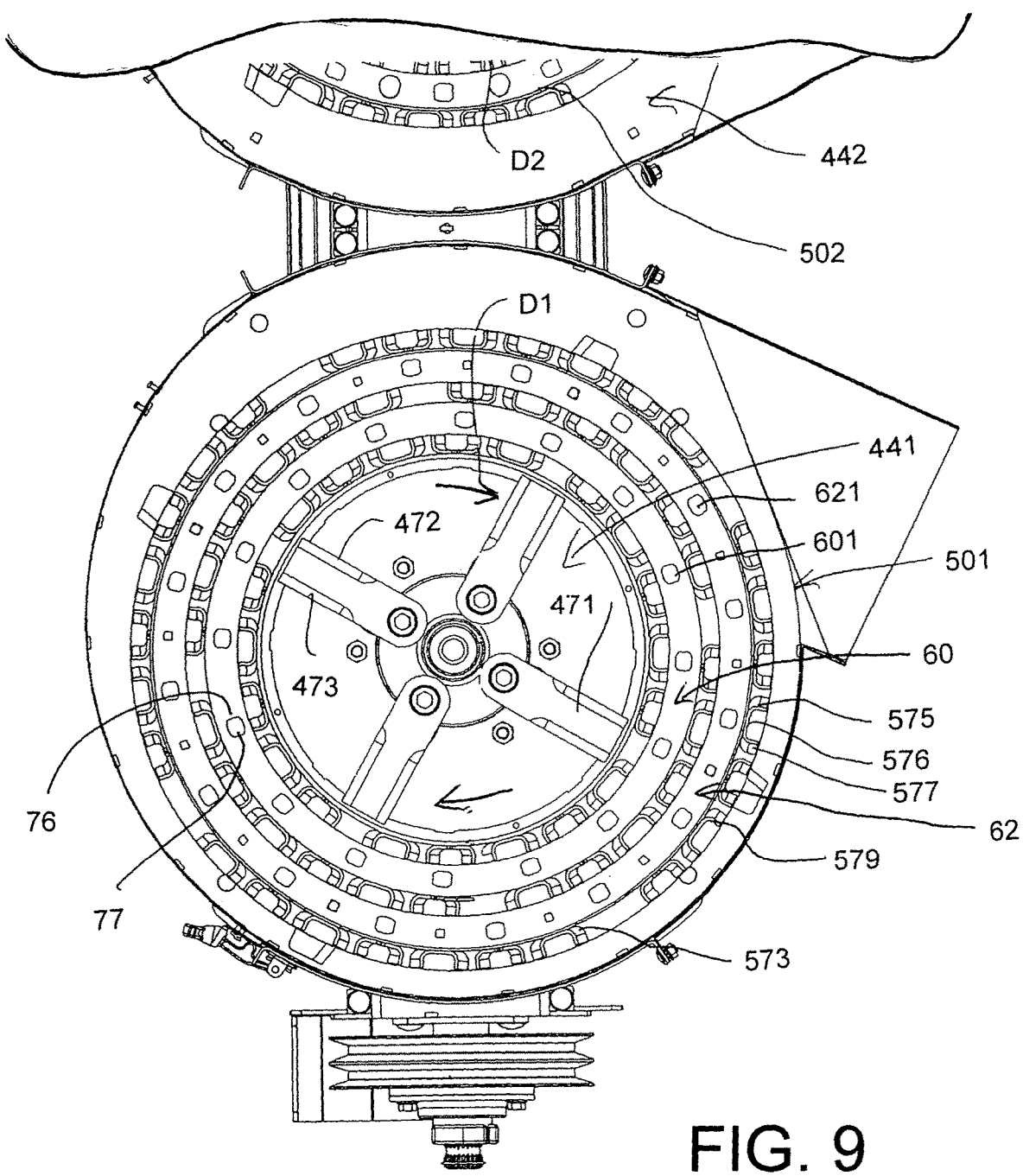
FIG. 9 is a cross sectional plan view similar to that of FIG. 2 showing a modified arrangement of the destructor in which the rotor blades and posts, and the stator bars are symmetrical and reversible.
Figure 10:
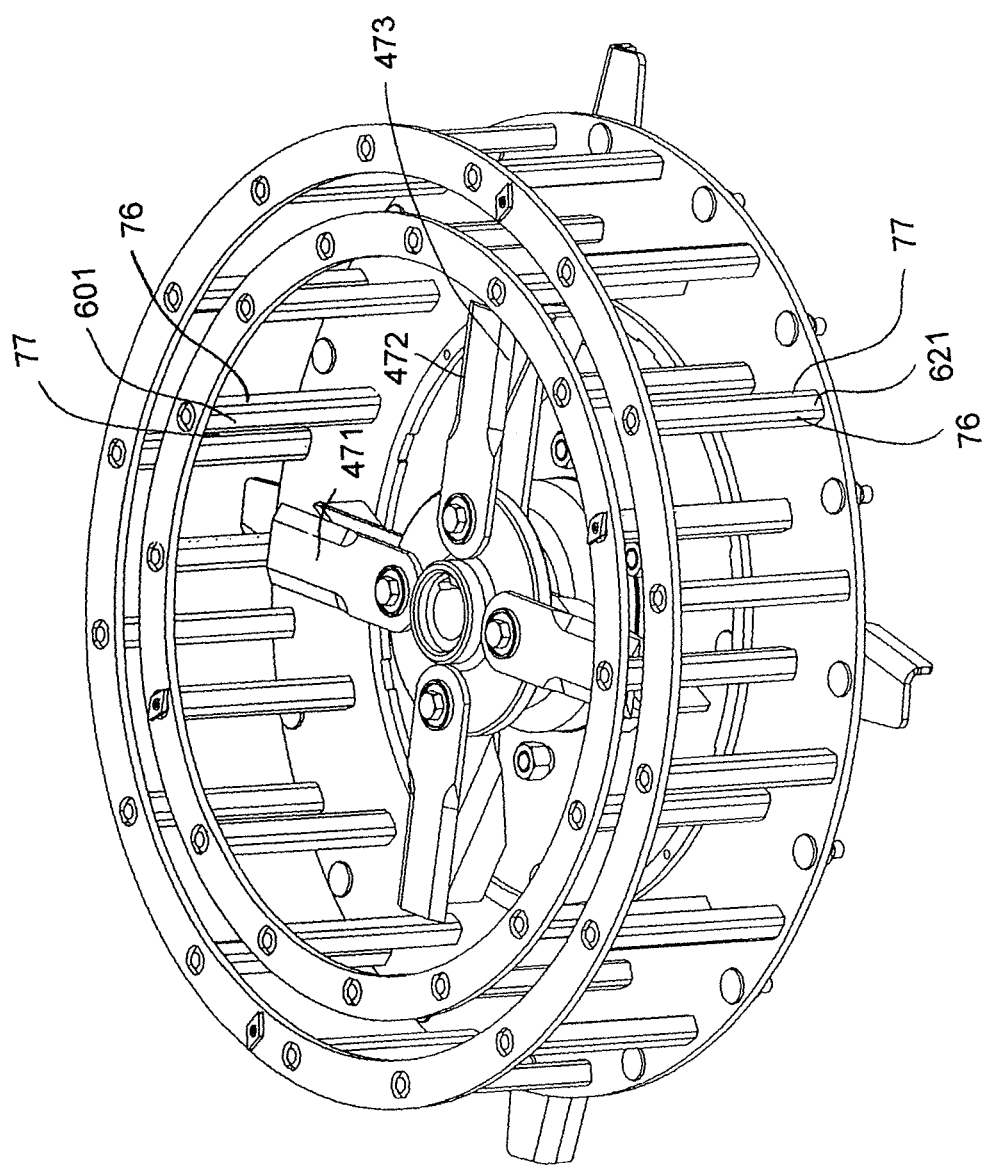
FIG. 10 is an isometric view of the embodiment of FIG. 9.

Turning now to the embodiment shown in FIGS. 9 and 10 the rotor substantially as previously described includes blades 471 which are modified relative to the blades 47 where the blades 471 are symmetrical with a leading edge 472 and a trailing edge 473 which are directly symmetrical so that the blade 471 can be reversed when worn on the leading edge and rotated in the opposite direction with the previously trailing edge now leading. Thus the previously trailing edge remains sharp and can be used in the reverse direction so that it takes the position of the now blunted previously leading edge.

The rotor posts 601 are also modified with a leading edge 76 and a trailing edge 77 which are directly symmetrical so that the rotor 60 can be reversed when worn on the leading edge and rotated in the opposite direction with the previously trailing edge 77 now leading. Optionally the rotor posts 601 can be hardened or hard surfaced on the leading and trailing edge 76, 77 in a symmetrical pattern. In this arrangement also the stator bars 57 are replaced by bars 579 which are symmetrical with a leading edge 575 and a trailing edge 577. Instead of being L-shaped as previously described therefore the bars 579 are U-shaped in cross-section with a base 576 and two legs 575 and 577 facing outwardly from the blades with the apexes 573 curved with a radius as previously described. Thus again the stator bars also can be reversed when worn on the leading edge. Optionally the stator bars can be hardened or hard surfaced on the leading and trailing impact surfaces in a symmetrical pattern.

In order to take best advantage of this reversibility, the first and second rotors 441, 442 each associated with a respective one of first and second stators 501, 502 and the first and second rotors are driven in opposed directions D1 and D2 so that the blades, posts and stators of one can be replaced by the blades, posts and stators of the other when worn on the leading edges thereof. That is the complete rotor and stator assemblies are changed from one side to the other.

In this arrangement the rotors are arranged side by side in the arrangement similar to that shown in FIG. 2, where the rotors are driven about parallel preferably upstanding axes and driven in the opposed directions.

In another construction not shown, the rotors are arranged at opposite ends of a common shaft and mounted in opposed symmetry so that in effect the common rotation of the shaft acts that the opposed rotors are driven by the shaft in opposed directions. Again therefore the system shown with the opposed symmetrical rotors allows the user to get twice the wear life. The wearing parts in these mills are one of the biggest portions of the annual operating costs so the arrangement provides a significant cost saving and selling advantage. Because the design has the left and right rotors spinning in opposite directions, the operator is able to get a full season of wear out of the rotor and stators and then in the off season the operator can move all the components from the right to the left side and vice versa and then wear out the other side of the assembly in a second season. There is also a significant advantage in the manufacturing and inventory of the parts. Because they are symmetrical, and can be used on both mills there are more of the same parts manufactured and inventoried leading to efficiencies and less specific parts that could be assembled incorrectly.

Figure 11:
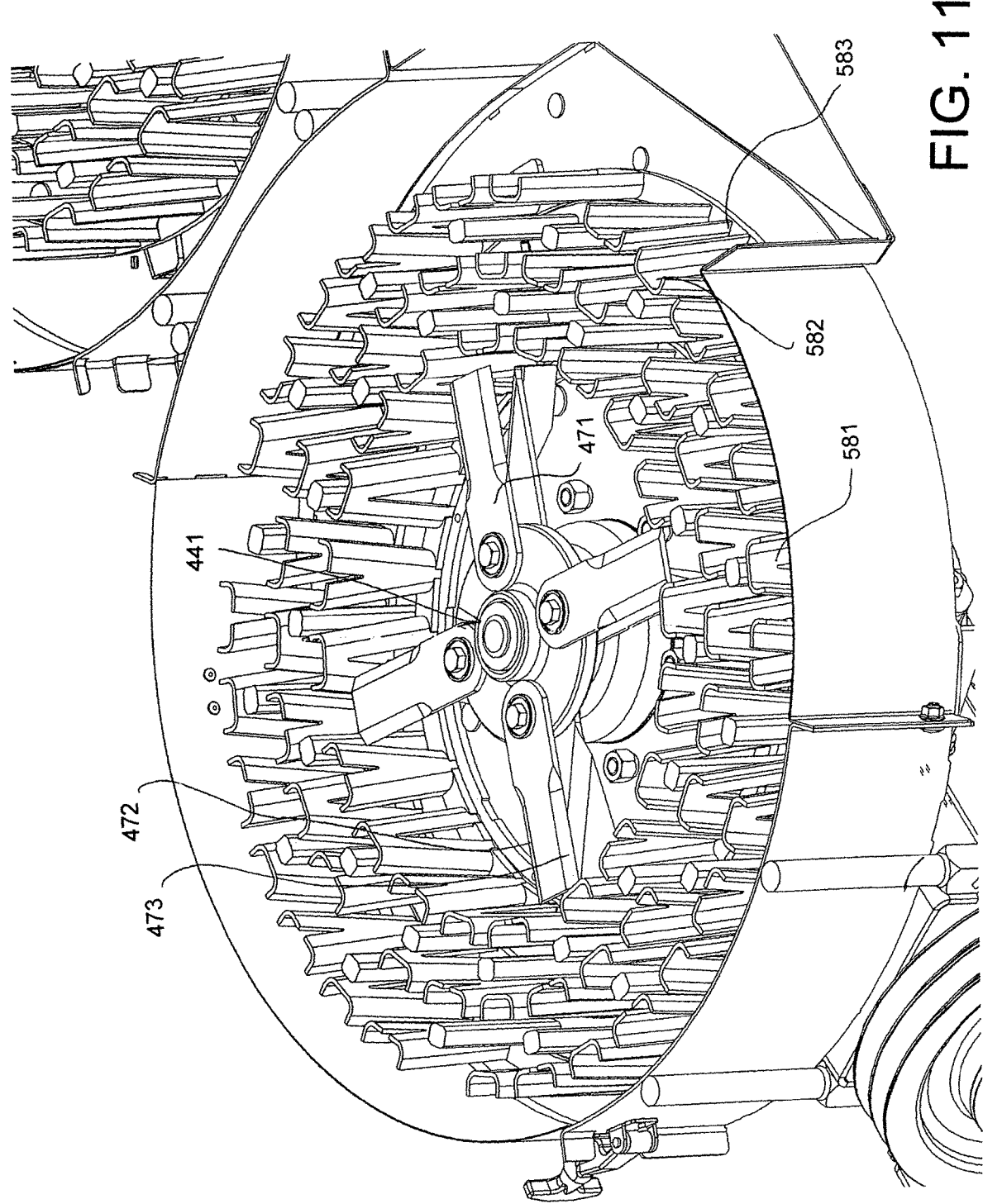
FIG. 11 is an isometric cross sectional view similar to that of FIG. 10 showing a further modified embodiment in which the stator bars are tapered along the length of the bar.
Figure 12:
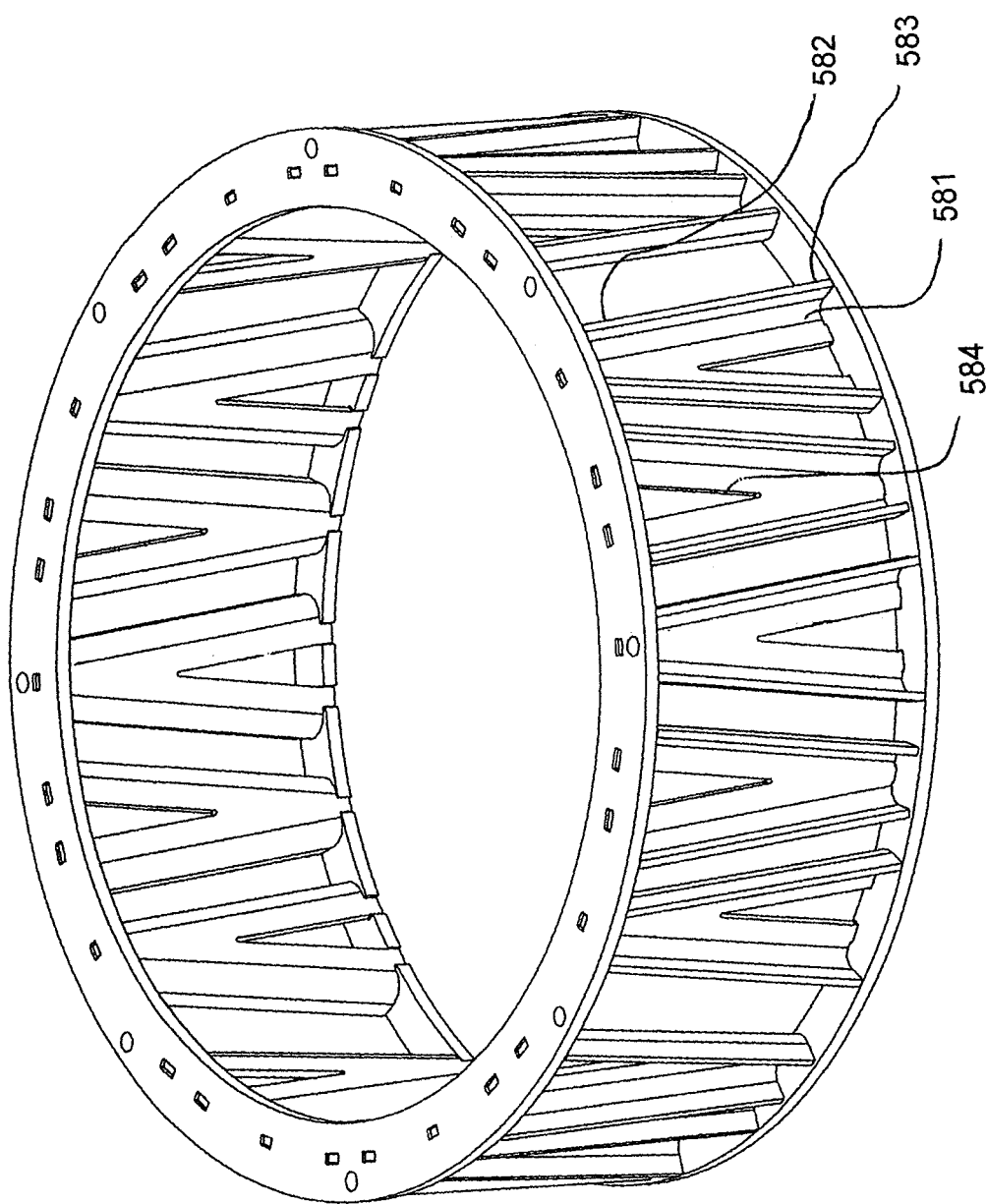
FIG. 12 is an isometric view of the one stator ring of the embodiment of FIG. 11.

According to another feature shown in FIGS. 11 and 12, the stator bars 581 are tapered from one end to the other end. The bars are then arranged in opposed pairs where one tapers from a wider end at the top 582 to a narrower end at the bottom 583 and the next is inverted. In this arrangement, the stator bars 581 have can a v-shaped slot 584 along a center line at the wider end to allow the escape of chaff and devitalized weed seed to reduce power requirements.

That is the tapered bars provide an angle of the leading edge of the stator bars which can be of the order of 10 degrees to vertical. This has a wear life advantage due to additional mixing in the mills in that it acts to randomize the chaff and weed seed load through the mill and counteracts the gravitational effects of the chaff flow through the mill to get a more even wear and thus a longer wear life, while also increasing the devitalization rate with the same power requirement. That is there is a tendency of the material to migrate along the bar toward the narrower end due to the incline of the leading edge in that direction. There is more wear life and an increased devitalization rate with the angled stator bars due to more even loading of the mill.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A method for destroying weed seeds in a feed material from a combine harvester comprising:
   mounting a weed seed destructor on the combine harvester, the weed seed destructor comprising:
   a rotor mounted for rotation in a direction of rotation about a rotor axis, the rotor including rotor surfaces thereon for engaging the feed material with outwardly facing rotor edges;
   a stator arranged at a location outwardly of the axis for engaging the weed seeds in the feed material;
   said stator comprising a plurality of stator bars at angularly spaced positions around the axis of the rotor and outwardly of the rotor edges;
   each stator bar extending axially along the axis of the rotor and being spaced from a next adjacent stator bar to provide an axially extending space therebetween through which the weed seeds can pass;
   wherein at least one stator bar comprises an elongate member which is U-shaped in cross-section to define a first leg lying in an imaginary cylindrical surface surrounding the axis of the rotor and a second leg and a third leg each extending outwardly from the imaginary cylindrical surface and each connected to the first leg at a respective apex at respective leading and trailing ends of the first leg relative to the direction of rotation of the rotor;
   the first leg of said at least one stator bar facing inwardly toward the outwardly facing rotor edges.

2. The method according to claim 1 wherein the second and third legs lie substantially at right angles to the first leg.

3. The method according to claim 1 wherein said at least one of the stator bars comprises a sheet metal plate which is bent to form said first, second and third legs.

4. A method for destroying weed seeds in a feed material from a combine harvester comprising:
   mounting a weed seed destructor on the combine harvester, the weed seed destructor comprising:
   at least one rotor mounted for rotation about a rotor axis, said at least one rotor including a plurality of rotor surfaces thereon for engaging the feed material;
   at least one stator for engaging the weed seeds in the feed material;
   said rotor surfaces of said at least one rotor having leading edges which face toward the feed material and trailing edges which face away from the feed material during movement of said at least one rotor in the feed material;
   and, when worn on the leading edges, replacing the worn leading edges of said at least one rotor with less worn trailing edges of said at least one rotor.

5. The method according to claim 4 wherein, when worn on the leading edges, at least one part of at least one of said at least one rotor is replaced with at least one other part of said at least one rotor and vice versa so that the worn leading edges of said at least one part are replaced by the less worn trailing edges of said at least one other part and vice versa.

6. The method according to claim 4 wherein said at least one rotor comprises first and second rotors arranged side by side and driven in opposed directions.

7. The method according to claim 4 wherein said at least one rotor comprises a plurality of rotor posts where each post has one of said rotor surfaces thereon which is symmetrical so that said leading edge and trailing edge are symmetrical.

8. The method according to claim 4 wherein said at least one stator comprises leading edges which face toward the feed material and trailing edges which face away from the feed material during movement of said feed material and wherein, when worn on said leading edges of said at least one stator, at least one part of said at least one stator is replaced by at least one other part of said at least one stator and vice versa so that said worn leading edges of said at least one part are replaced by less said worn trailing edges of said at least one other part and vice versa.

9. The method according to claim 8 wherein said rotor surfaces include outwardly facing rotor edges; wherein said at least one stator comprises a plurality of stator bars at angularly spaced positions around the axis of the rotor; each stator bar extending axially along the axis of the rotor and being spaced from a next adjacent stator bar to provide an axially extending space therebetween through which weed seeds can pass; wherein at least one stator bar comprises an elongate member which is U-shaped in cross-section to define a first leg lying in an imaginary cylindrical surface surrounding the axis of the rotor and a second leg and a third leg each extending outwardly from the imaginary cylindrical surface and each connected to the first leg at an apex at a leading and trailing end of the first leg relative to the direction of rotation of the rotor, and wherein the first leg of said at least one stator bar faces inwardly toward the outwardly facing rotor edges.

10. The method according to claim 9 wherein said at least one of the stator bars comprises a sheet metal plate which is bent to form said legs.

11. A method for destroying weed seeds in a feed material from a combine harvester comprising:
mounting a weed seed destructor on the combine harvester, the weed seed destructor comprising:
a first rotor mounted for rotation about a first rotor axis, the first rotor including a plurality of first rotor surfaces thereon for engaging the feed material;
a second rotor mounted for rotation about a second rotor axis, the second rotor including a plurality of second rotor surfaces thereon for engaging the feed material;
at least one stator for engaging the weed seeds in the feed material;
each of said first rotor surfaces of said first rotor and said second surfaces of said second rotor having leading edges which face toward the feed material and trailing edges which face away from the feed material during movement of the first and second rotors in the feed material;
and, when worn on the leading edges, replacing at least a part of the first rotor with at least a part of the second rotor and vice versa so that the worn leading edges of the first rotor are replaced with less worn trailing edges of said second rotor and vice versa.

12. The method according to claim 11 wherein, when worn on the leading edges, the first rotor is replaced in whole by the second rotor.

13. The method according to claim 11 wherein said first and second rotors are arranged side by side and driven in opposed directions.

14. The method according to claim 11 wherein said first and second rotors each comprise a plurality of rotor posts where each post has one of said rotor surfaces thereon which is symmetrical so that said leading edge and trailing edge are symmetrical.

15. The method according to claim 11 wherein said at least one stator comprises a first stator including stator surfaces thereon for engaging the feed material and a second stator including stator surfaces thereon for engaging the feed material; the stator surfaces of said first and second stators having each leading edges which face toward the feed material and trailing edges which face away from the feed material during movement of the feed material and, when worn on the leading edges, replacing at least a part of the first stator by at least a part of the second stator and vice versa so that the worn leading edges are replaced by the less worn trailing edges.

16. The method according to claim 15 wherein, when worn on the leading edges, the first stator is replaced in whole by the second stator.

17. The method according to claim 11 wherein said rotor surfaces include outwardly facing rotor edges; wherein said at least one stator comprises a plurality of stator bars at angularly spaced positions around the axis of the rotor; each stator bar extending axially along the axis of the rotor and being spaced from a next adjacent stator bar to provide an axially extending space therebetween through which weed seeds can pass; wherein at least one stator bar comprises an elongate member which is shaped in cross-section to define a first leg lying in an imaginary cylindrical surface surrounding the axis of the rotor and a second leg and a third leg each extending outwardly from the imaginary cylindrical surface and each connected to the first leg at an apex at a leading and trailing end of the first leg relative to the direction of rotation of the rotor, and wherein the first leg of said at least one stator bar faces inwardly toward the outwardly facing rotor edges.

18. The method according to claim 17 wherein said at least one of the stator bars comprises a sheet metal plate which is bent to form said legs.

19. A method for destroying weed seeds in a feed material from a combine harvester comprising:
mounting a weed seed destructor on the combine harvester, the weed seed destructor comprising:
at least one rotor for engaging the weed seeds in the feed material for rotation about a first rotor axis for driving movement of the feed material;
a first stator including a plurality of first stator surfaces thereon for engaging the feed material;
a second stator including a plurality of second stator surfaces thereon for engaging the feed material;
each of said first stator surfaces of said first stator and said second stator of said second stator having leading edges which face toward the feed material and trailing edges which face away from the feed material during movement of the feed material;
and, when worn on the leading edges, replacing at least a part of the first stator with at least a part of the second stator and vice versa so that the worn leading edges of the first stator are replaced with the less worn trailing edges of said second stator and vice versa.

20. The method according to claim 19 wherein, when worn on the leading edges, the first stator is replaced in whole by the second stator.

21. The method according to claim 19 wherein said at least one rotor includes rotor surfaces having outwardly facing rotor edges; wherein each of said first and second stators comprises a plurality of stator bars at angularly spaced positions around the axis of the rotor; each stator bar extending axially along the axis of the rotor and being spaced from a next adjacent stator bar to provide an axially extending space therebetween through which weed seeds can pass; wherein at least one stator bar comprises an elongate member which is U-shaped in cross-section to define a first leg lying in an imaginary cylindrical surface surrounding the axis of the rotor and a second leg and a third leg each extending outwardly from the imaginary cylindrical surface and each connected to the first leg at an apex at a leading and trailing end of the first leg relative to the direction of rotation of the rotor, and wherein the first leg of said at least one stator bar faces inwardly toward the outwardly facing rotor edges.

22. The method according to claim 21 wherein said at least one of the stator bars comprises a sheet metal plate which is bent to form said legs.

\* \* \* \* \*